(12) United States Patent
Zheng et al.

(10) Patent No.: US 10,972,496 B2
(45) Date of Patent: Apr. 6, 2021

(54) UPLOAD INTERFACE IDENTIFICATION METHOD, IDENTIFICATION SERVER AND SYSTEM, AND STORAGE MEDIUM

(71) Applicant: Tencent Technology (Shenzhen) Company Limited, Shenzhen (CN)

(72) Inventors: Xing Zheng, Shenzhen (CN); Po Hu, Shenzhen (CN); Jing Guo, Shenzhen (CN); Qiang Zhang, Shenzhen (CN); Yuhe Fan, Shenzhen (CN); Fang Wang, Shenzhen (CN); Yong Yang, Shenzhen (CN); Wentao Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/443,433

(22) Filed: Jun. 17, 2019

(65) Prior Publication Data
US 2019/0306186 A1 Oct. 3, 2019

Related U.S. Application Data

(63) Continuation of application No. PCT/CN2018/080269, filed on Mar. 23, 2018.

(30) Foreign Application Priority Data

Apr. 11, 2017 (CN) .......................... 201710233531.9

(51) Int. Cl.
*G06F 21/00* (2013.01)
*H04L 29/06* (2006.01)
*H04L 29/08* (2006.01)

(52) U.S. Cl.
CPC .......... *H04L 63/1433* (2013.01); *H04L 29/06* (2013.01); *H04L 63/1416* (2013.01);
(Continued)

(58) Field of Classification Search
CPC ............. H04L 63/1433; H04L 63/1491; H04L 63/1416; H04L 41/22; H04L 43/0817
See application file for complete search history.

(56) References Cited

U.S. PATENT DOCUMENTS 9,009,841 B2  4/2015  Amit et al.
9,241,007 B1  1/2016  Witter et al.
(Continued)

FOREIGN PATENT DOCUMENTS

CN  104079429 A  10/2014
CN  104079528 A  10/2014
(Continued)

OTHER PUBLICATIONS

Tencent Technology, ISRWO, PCT/CN2018/080269, Jun. 27, 2018, 6 pgs.
(Continued)

*Primary Examiner* — Ghazal B Shehni
(74) *Attorney, Agent, or Firm* — Morgan Lewis & Bockius, LLP

(57) ABSTRACT

Embodiments of this application provide an upload interface identification method performed at an identification server. The identification server obtains a to-be-identified request packet that is contained in request packets from a page client to a page server. After parsing a content feature of the to-be-identified request packet, the server determines whether the content feature corresponds to a predefined content feature of an upload request packet authorized by the page server. The server then determines that an interface address indicated by the upload request packet corresponds
(Continued)

to an upload interface of the to-be-identified request packet if the content feature corresponds to the set content feature of the upload request packet.

17 Claims, 10 Drawing Sheets

(52) U.S. Cl.
CPC .............. *H04L 63/20* (2013.01); *H04L 67/02* (2013.01); *H04L 69/22* (2013.01)

(56) References Cited

U.S. PATENT DOCUMENTS

| | | |
|---|---|---|
| 2012/0311714 A1* | 12/2012 | Amit .................... G06F 21/577 726/25 |
| 2016/0127389 A1 | 5/2016 | Hunt et al. |
| 2018/0034846 A1* | 2/2018 | Marquez ............. H04L 63/1433 |

FOREIGN PATENT DOCUMENTS

| | | |
|---|---|---|
| CN | 104537309 A | 4/2015 |
| CN | 105227387 A | 1/2016 |
| CN | 105516073 A | 4/2016 |
| CN | 106302337 A | 1/2017 |
| WO | WO 2016150304 A1 | 9/2016 |

OTHER PUBLICATIONS

Tencent Technology, IPRP, PCT/CN2018/080269, Oct. 15, 2019, 5 pgs.

* cited by examiner

UPLOAD INTERFACE IDENTIFICATION METHOD, IDENTIFICATION SERVER AND SYSTEM, AND STORAGE MEDIUM

CROSS-REFERENCE TO RELATED APPLICATIONS

This application is a continuation application of PCT/CN2018/080269, entitled "UPLOAD INTERFACE IDENTIFICATION METHOD, IDENTIFICATION SERVER AND SYSTEM, AND STORAGE MEDIUM" filed on Mar. 23, 2018, which claims priority to Chinese Patent Application No. 201710233531.9, filed with the Chinese Patent Office on Apr. 11, 2017 and entitled "UPLOAD INTERFACE IDENTIFICATION METHOD, AND IDENTIFICATION SERVER AND SYSTEM", all of which are incorporated by reference in their entirety.

FIELD OF THE TECHNOLOGY

This application relates to the field of data processing technologies, and specifically, to an upload interface identification method, an identification server and system, and a storage medium.

BACKGROUND OF THE DISCLOSURE

Currently, most pages (such as pages provided by websites, web programs, and the like) all support a file upload function. When using the file upload function, a user may upload files, such as a user avatar, an album picture, and an attachment, by using an upload interface provided by a page. However, the convenient file upload function is likely to become an entrance point for hackers, resulting in a file upload vulnerability.

The file upload vulnerability refers to uploading, by a hacker through an upload interface, a dangerous file to a catalogue that is accessed through a website or a web program. The dangerous file may execute a script on a remote server, to control the server. It can be learned that the file upload vulnerability seriously threats use security of websites and web programs. Therefore, it is very necessary to identify a file upload vulnerability that a page has.

To identify the file upload vulnerability that a page has, an upload interface in the page needs to be identified first, and then whether the upload interface corresponds to a file upload vulnerability is identified by operating the upload interface. Therefore, identification of the upload interface in the page is a prior step of identification of the file upload vulnerability, and comprehensiveness of identification of the upload interface is crucial to comprehensiveness of subsequent identification of the file upload vulnerability.

An existing upload interface identification manner is mainly determining, by crawling a page by using a web crawler technology and then determining whether there is a label of input type="file" (an input type is a file) in the crawled page, whether the page has an upload interface. That is, if there is a label of input type="file" in the page, it is considered that the page has an upload interface. Otherwise, it is considered that the page does not have an upload interface.

However, input type="file" is merely a common implementation form of upload interfaces in pages, the manner of identifying the upload interface by determining the label of input type="file" in the page may lead to missing detection of upload interfaces implemented in other forms. Consequently, a detection missing probability of upload interfaces is improved, and comprehensiveness of upload interface identification is lowered.

SUMMARY

In view of the above, embodiments of this application provide an upload interface identification method, an identification server and system, and a storage medium, to lower a detection missing probability of an upload interface and improve comprehensiveness of identification of the upload interface.

To achieve the foregoing objective, the embodiments of this application provide the following technical solution:

According to a first aspect of the present disclosure, an upload interface identification method is performed at an identification server having one or more processors and memory storing a plurality of instructions to be executed by the server, the method comprising:

obtaining a to-be-identified request packet, the to-be-identified request packet being contained in request packets that are sent by a page client to a page server;

parsing a content feature of the to-be-identified request packet;

determining whether the content feature corresponds to a predefined content feature of an upload request packet authorized by the page server; and determining that the to-be-identified request packet is the upload request packet and determining that an interface address indicated by the upload request packet corresponds to an upload interface of the to-be-identified request packet when the content feature corresponds to the predefined content feature of the upload request packet.

According to a second aspect of the present disclosure, an identification server is further provided. The identification server includes one or more processors, memory coupled to the one or more processors, and a plurality of program modules stored in the memory. The program modules, when executed by the one or more processors, cause the identification server to perform the aforementioned upload interface identification method.

According to a third aspect of the present disclosure, an non-transitory computer readable storage medium stores a plurality of machine readable instructions in connection with an identification server having one or more processors. The plurality of machine readable instructions, when executed by the one or more processors, cause the identification server to perform the aforementioned upload interface identification method.

Based on the foregoing technical solutions, in the upload interface identification method provided in the embodiments of this application, an identification server may obtain a to-be-identified request packet, the to-be-identified request packet being contained in request packets that are sent by a page client to a page server, so that the identification server may parse a content feature of the to-be-identified request packet, and determine whether the content feature corresponds to a predefined content feature of an upload request packet authorized by the page server. The identification server may determine that the to-be-identified request packet is the upload request packet and determine that an interface address indicated by the upload request packet corresponds to an upload interface if the content feature corresponds to the predefined content feature of the upload request packet, to identify the upload interface.

It should be noted that being constrained by a network protocol such as the HTTP, the upload request packet needs to carry a content feature that is agreed upon. Therefore, a request packet whose content feature corresponds to a predefined content feature of the upload request packet is determined by performing content feature analysis on a request packet sent to the page server, to effectively identify a request packet of an upload request, to determine that the interface address indicated by the identified request packet corresponds to the upload interface, to identify the upload interface. Because an HTTP upload request, for example, necessarily carries the content feature that is agreed upon, the upload request packet is identified through the content feature, to determine the upload interface with the interface address indicated by the identified upload request packet, to comprehensively identify the upload request packet. In addition, comprehensiveness of the identified upload interface is correspondingly improved, and a detection missing probability is lowered.

BRIEF DESCRIPTION OF THE DRAWINGS

To describe the technical solutions in the embodiments of this application or the related technology more clearly, the following briefly describes the accompanying drawings required for describing the embodiments or the related technology. Apparently, the accompanying drawings in the following descriptions show merely some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

To lower a detection missing probability of an upload interface and improve comprehensiveness of identification of the upload interface, it is considered in this embodiment of this application to collect a request packet that is sent by a page client to a page server, perform content feature analysis on the collected request packet, and select a request packet whose content feature corresponds to that of an upload request packet authorized by the page server, to determine that an interface address indicated by the request packet corresponds to the upload interface, to identify the upload interface.

Being constrained by a network protocol such as the Hypertext Transfer Protocol (HTTP), an HTTP upload request packet, for example, needs to carry a content feature that is agreed upon. Therefore, content feature analysis is performed on the request packet sent to the page server, to identify the upload interface in a page, to improve comprehensiveness of identification of the upload interface.

Figure 1:
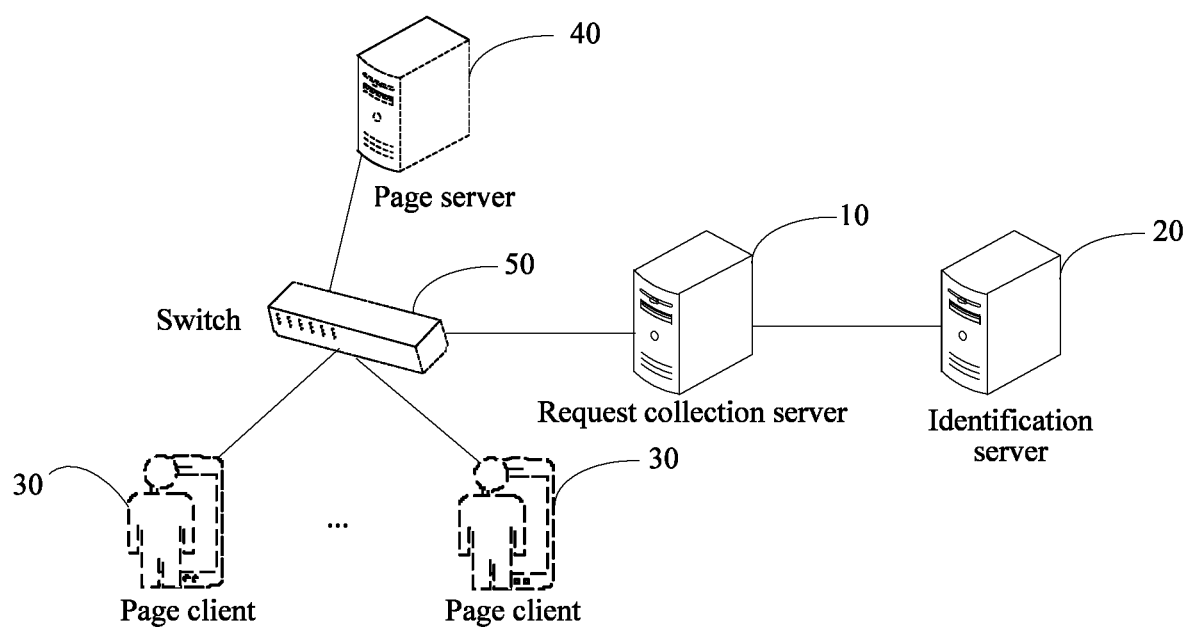
FIG. 1 is a schematic architectural diagram of an upload interface identification system according to an embodiment of this application.

Based on this idea, FIG. 1 is a schematic architectural diagram of an upload interface identification system according to an embodiment of this application. An upload interface identification method provided in this embodiment of this application may be implemented through the upload interface identification system. Referring to FIG. 1, the upload interface identification system may include: a request collection server 10 and an identification server 20. In some embodiments, FIG. 1 also shows a page client 30, a page server 40, and a switch 50 that may not exist in the upload interface identification system but may cooperate with the request collection server 10.

The page client 30 may be regarded as a client having a page loading (a page such as a website and a web program) function such as a browser and a web client. The page client 30 may be disposed on user equipment such as a smartphone, a tablet computer, and a notebook computer.

The page server 40 is a service device that is disposed at a network side and that provides a page service, such as a website server and a web server. An interaction manner of the page client 30 and the page server 40 is that the page client sends a request packet, such as a page loading request and an upload request, to the page server, and the page server makes a corresponding response, and feeds back page content, an upload feedback result, and the like to the page client.

The request collection server 10 may a network device capable of collecting network layer traffic between the page client and the page server, including request inflow rates (such as request inflow rates of the fourth layer to the seventh layer) between the page client and the page server. That is, the request collection server 10 may collect request packets that are sent by the page client to the page server. In some embodiments, in an optional implementation, the request collection server 10 may be implemented by selecting an intrusion detection system (IDS) server.

The identification server 20 is a service device that is disposed in this embodiment of this application and that is configured to implement upload interface identification in a page. The identification server 20 may be implemented by a server or by a server group including a plurality of servers.

In this embodiment of this application, the identification server 20 may obtain the request packets collected by the request collection server 10, perform content feature analysis on the request packets, and identify, from the collected request packets, a request packet whose content feature corresponds to that of an upload request packet authorized by the page server, to determine that an interface address indicated by the identified upload request packet corresponds to the upload interface, to identify the upload interface.

Figure 2:
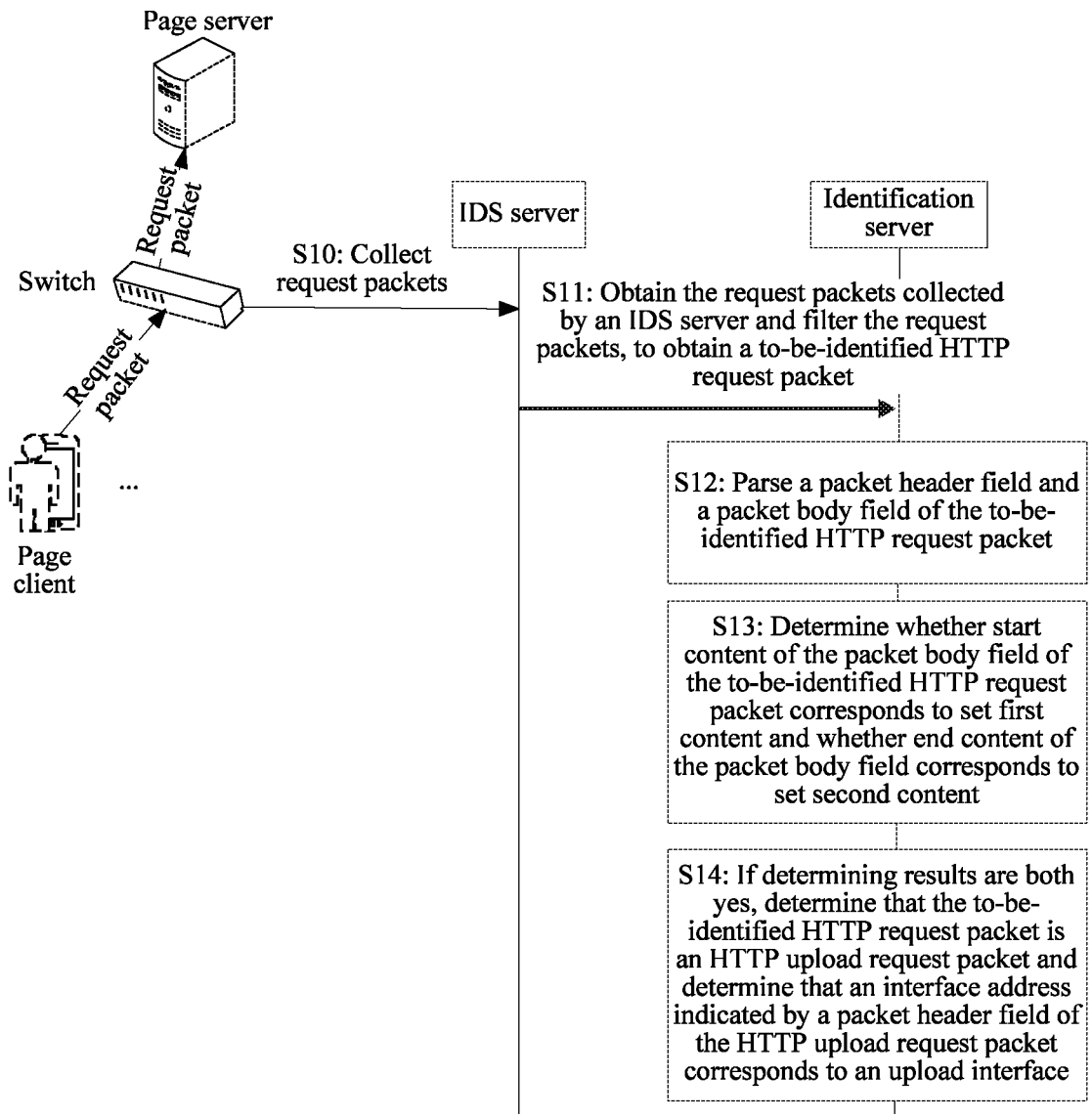
FIG. 2 is a signaling flowchart of an upload interface identification method according to an embodiment of this application.

Using an example in which the page client and the page server interact by using the HTTP, the corresponding request packet may be an HTTP request packet. FIG. 2 is a signaling procedure of an upload interface identification method according to an embodiment of this application. Referring to FIG. 2, a procedure may include the following steps:

Step S10: An IDS server collects request packets that are sent by a page client to a page server.

The IDS server may be regarded as an optional implementation form of a request collection server. The IDS server may monitor an interaction process of the page client and the page server, to collect, from the monitored content, the request packets sent to the page server, that is, collect request packets corresponding to an entrance of the page server (the request packets corresponding to the entrance of the page server may be regarded as inflow rates of the page server).

In some embodiments, the request packets sent to the page server may be a page loading request packet for requesting to load page content, an upload request packet for uploading a file, and the like.

Step S11: An identification server obtains the request packets collected by the IDS server and filters the request packets, to obtain a to-be-identified HTTP request packet.

In some embodiments, the HTTP request packet is only an optional form of the request packets sent to the page server when the HTTP is used. When other network protocols are used, the form of the request packets may be correspondingly adjusted. Descriptions are made by using an example of the HTTP request packet herein.

The IDS server may upload the collected request packets to the identification server periodically (periods may be appointed in advance) or according to an upload instruction (which may be input by a staff). In some embodiments, in a process in which the IDS server uploads a request packet to the IDS server once, the IDS server may upload request packets that are collected from a time when last uploading ends to an uploading period of this time.

Because there may be illegal request packets that are repeated and that do not satisfy HTTP requirements in the request packets collected by the IDS server (because the HTTP is used, the upload request needs to follow the HTTP requirements; the collected request packets that do not satisfy the HTTP requirements need to be removed), the identification server may filter the request packets obtained from the IDS server, to obtain the to-be-identified HTTP request packet.

The filtering may include but be not limited to: de-duplicating the request packets (for example, de-duplicating request packets whose common gateway interfaces (CGI) are the same, and parameters are the same, but values are different and summarizing the request packets as the same request packet) and removing the request packets that do not satisfy the HTTP.

In some embodiments, it is not necessary to filter the request packets collected by the IDS server. In this embodiment of this application, the request packets collected by the IDS server may be directly used as the to-be-identified HTTP request packets.

Step S12: The identification server parses a packet header field and a packet body field of the to-be-identified HTTP request packet.

In some embodiments, the number of the obtained to-be-identified HTTP request packets may be at least one. For each to-be-identified HTTP request packet, the HTTP may be used in this embodiment of this application to parse the to-be-identified HTTP request packet, to obtain an http header (packet header) field and an http body (packet body) field of the to-be-identified HTTP request packet.

Step S13: The identification server determines whether start content of the packet body field of the to-be-identified HTTP request packet corresponds to predefined first content and whether end content of the packet body field corresponds to predefined second content.

In some embodiments, the identification server may select the to-be-identified HTTP request packets randomly or in sequence (for example, according to a collection sequence corresponding to the to-be-identified HTTP request packets) and perform processing shown in step S13 on the selected to-be-identified HTTP request packets until all the to-be-identified HTTP request packets are processed.

In some embodiments, the predefined first content may be start content that is followed by an HTTP upload request packet in the packet body field according to the HTTP, and the predefined second content may be end content that is followed by the HTTP upload request packet in the packet body field according to the HTTP.

For example, according to the HTTP, the HTTP upload request packet usually has an upload keyword such as multipart or form-data.

Using an example of having a keyword of multipart, a packet body field of multipart in an HTTP upload request packet starts with content of "\r\n"+"--"+boundary, and ends with content of "\r\n"+"--"+boundary+"--" when a packet body of the HTTP upload request packet ends. Therefore, if the start content of the packet body field of the to-be-identified HTTP request packet starts with the content of "\r\n"+"--"+boundary, and ends with the content of "\r\n"+"--"+boundary+"--" when the packet body ends, it is considered that the to-be-identified HTTP request packet is the HTTP upload request packet.

It is obvious that above descriptions of the first content and the second content that are made by using an example of the keyword of multipart are merely exemplary, and forms of the first content and the second content may be correspondingly adjusted according to different used upload keywords and may be specifically determined according to actual use situations of the HTTP.

Step S14: The identification server determines that the to-be-identified HTTP request packet is an HTTP upload request packet and determines that an interface address indicated by a packet header field of the HTTP upload request packet corresponds to an upload interface if the start content of the packet body field of the to-be-identified HTTP request packet corresponds to the predefined first content, and the end content of the packet body field corresponds to the predefined second content.

In some embodiments, if the start content of the packet body field of the to-be-identified HTTP request packet corresponds to the predefined first content, and the end content of the packet body field corresponds to the predefined second content, the to-be-identified HTTP request packet is the HTTP upload request packet. An upload interface address of the HTTP upload request packet is usually carried in the packet header field of the HTTP upload request packet. In this embodiment of this application, the correspondingly indicated interface address may be determined from the packet header field of the HTTP upload request packet, and that the interface address corresponds to the upload interface is determined, to identify the upload interface.

In some embodiments, the interface address corresponding to the HTTP upload request packet may not be carried in the packet header field, and carrying the interface address of the upload interface in the packet header field is merely an optional form.

It should be noted that step S12 to step S14 are performed by using one to-be-identified HTTP request packet as the basis.

It should be noted that step S12 and step S13 are a specific implementation of obtaining, by the identification server, the to-be-identified HTTP request packet, parsing a content feature of the to-be-identified HTTP request packet, and determining whether the parsed content feature corresponds to a content feature corresponding to the HTTP upload request packet.

Step S14 may be regarded as a specific implementation of after determining that the content feature of the to-be-identified HTTP request packet corresponds to the content feature corresponding to the HTTP upload request packet, determining that the to-be-identified HTTP request packet is the HTTP upload request packet and determining that the interface address indicated by the HTTP upload request packet corresponds to the upload interface.

Figure 3:
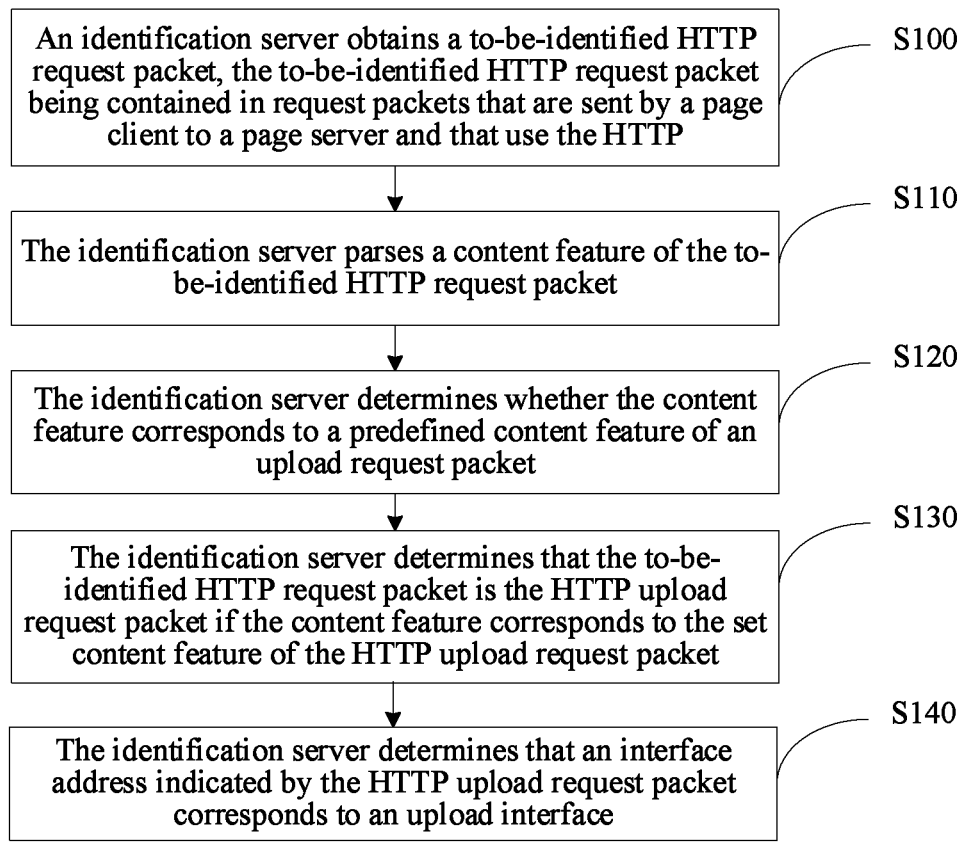
FIG. 3 is a flowchart of an upload interface identification method according to an embodiment of this application.

Based on the signaling procedure shown in FIG. 2, from the point of view of the identification server, the upload interface identification method provided in this embodiment of this application may be shown in FIG. 3. Method content shown in FIG. 3 is a core procedure for the identification server to identify the upload interface. Based on the core procedure, mutual reference may be made to specific implementation details and the foregoing content.

As shown in FIG. 3, the method may include:

Step S100: An identification server obtains a to-be-identified HTTP request packet, the to-be-identified HTTP request packet being contained in request packets that are sent by a page client to a page server and that use the HTTP.

In some embodiments, an optional manner for the identification server to obtain the to-be-identified HTTP request packet may be: obtaining the request packets that are collected by the IDS server and that are sent by the page client to the page server, and filtering the obtained request packets, to obtain a non-repeating request packet that is sent by the page client to the page server and that uses the HTTP.

In some embodiments, the identification server may directly use the request packets that are collected by the IDS server and that are sent by the page client to the page server as the to-be-identified HTTP request packets.

In some embodiments, the to-be-identified HTTP request packet is merely an optional form of the to-be-identified request packet when the HTTP is used, and the to-be-identified request packet may be contained in the request packets that are sent by the page client to the page server.

Step S110: The identification server parses a content feature of the to-be-identified HTTP request packet.

In some embodiments, the identification server may parse a packet header field and a packet body field of the to-be-identified HTTP request packet. The content feature herein is not limited to corresponding to content of the parsed packet body field.

Step S120: The identification server determines whether the content feature corresponds to a predefined content feature of an upload request packet authorized by the page server.

In some embodiments, the identification server may determine whether start content of the packet body field of the to-be-identified HTTP request packet corresponds to predefined first content and whether end content of the packet body field corresponds to predefined second content. In addition, the predefined first content may be start content that is followed by an HTTP upload request packet in the packet body field according to the HTTP, and the predefined second content may be end content that is followed by the HTTP upload request packet in the packet body field according to the HTTP.

In some embodiments, in addition to that the content feature of the HTTP upload request packet is set by setting the start content and the end content of the HTTP upload request packet, other manners may be used in this embodiment of this application to set the content feature of the HTTP upload request packet. For example, particular identification character is set in packet header content of the HTTP upload request packet, and the identification character may be used for representing the HTTP upload request packet.

In some embodiments, the HTTP upload request packet is merely an optional form of an upload request packet in this embodiment of this application. When other protocols are used, the form of the upload request packet may be correspondingly adjusted.

Step S130: The identification server determines that the to-be-identified HTTP request packet is the HTTP upload request packet if the content feature corresponds to the predefined content feature of the HTTP upload request packet.

Step S140: The identification server determines that an interface address indicated by the HTTP upload request packet corresponds to an upload interface.

In some embodiments, if the content feature of the to-be-identified HTTP request packet corresponds to the predefined content feature of the HTTP upload request packet, the indicated interface address is extracted from the packet header field of the to-be-identified HTTP request packet, and that the interface address corresponds to the upload interface is determined.

In the upload interface identification method provided in this embodiment of this application, an identification server may obtain a to-be-identified HTTP request packet, the to-be-identified HTTP request packet being contained in request packets that are sent by a page client to a page server and that use the HTTP, so that the identification server may parse a content feature of the to-be-identified HTTP request packet, and determine whether the content feature corresponds to a predefined content feature of an HTTP upload request packet. The identification server may determine that the to-be-identified HTTP request packet is the HTTP upload request packet and determine that an interface address indicated by the HTTP upload request packet corresponds to an upload interface if the content feature corresponds to the predefined content feature of the HTTP upload request packet, to identify the upload interface.

It should be noted that being constrained by a network protocol such as the HTTP, the HTTP upload request packet needs to carry a content feature that is agreed upon. Therefore, a request packet whose content feature corresponds to a predefined content feature of the HTTP upload request packet is determined by performing content feature analysis on a request packet sent to the page server, to effectively identify a request packet of an upload request, to determine that the interface address indicated by the identified request packet corresponds to the upload interface, to identify the upload interface. Because an HTTP upload request, for example, necessarily carries the content feature that is agreed upon, the upload request packet is identified through the content feature, to determine the upload interface with the interface address indicated by the identified upload request packet, to comprehensively identify the upload request packet. In addition, comprehensiveness of the identified upload interface is correspondingly improved, and a detection missing probability is lowered.

In some embodiments, the manner of identifying the upload interface by crawling a page by using a web crawler and determining whether page source code contains a label of <input type="file"> in the related technology may contain a situation in which this kind of label does not indicate that a page enables an upload function, leading to a false alarm of the determined upload interface. In this embodiment of this application, a characteristic of the content feature that is agreed upon is necessarily carried through an HTTP upload request packet, for example. Identifying the upload interface indicates that the identified upload interface is in an enabled state, so that the HTTP upload request packet for the upload interface is sent to the page server. Therefore, the upload interface identification method provided in this embodiment of this application can also avoid a false alarm of the identified upload interface and improve accuracy of an identification result.

In addition, an existing manner of crawling a page by using a web crawler causes a high-frequency request to easily occupy system resources of the page server, leading to a failure of a page service, while in this embodiment of this application, that the web crawler crawls a page, leading to a high-frequency request of the page server may be avoided by collecting the request packets that are sent by the page client to the page server as source data, to reduce pressure of the page server.

Figure 4:
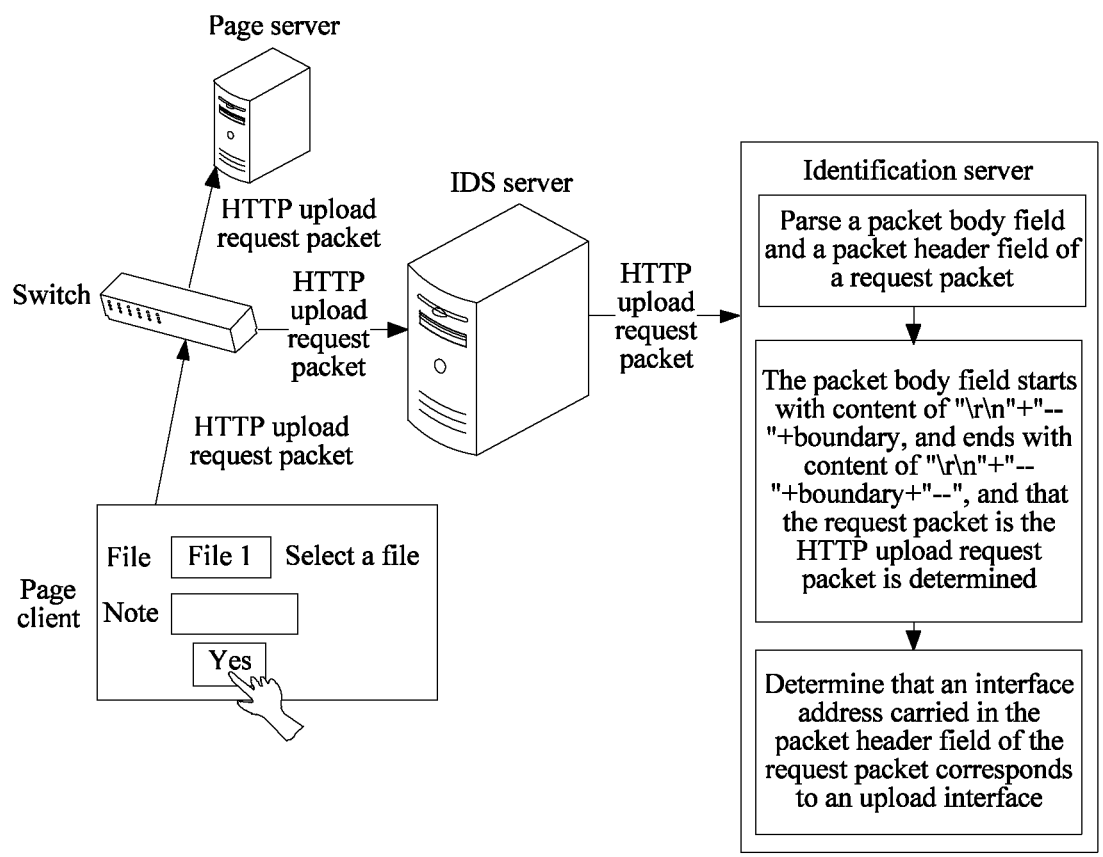
FIG. 4 is an example diagram of upload interface identification.

In some embodiments, as shown in FIG. 4, for ease of description, using processing of a request packet (the request packet corresponding to an HTTP upload request) as an example, an application example of the upload interface identification method provided in this embodiment of this application is described:

The page client may upload a document file in the upload interface of the page, so that the page client can construct the request packet corresponding to the HTTP upload request and send the request packet to the page server.

The IDS server collects the request packets that are sent by the page client to the page server and uploads the request packets to the identification server.

The identification server parses a packet body field and a packet header field of the request packet. It should be noted that descriptions are made by using collection and processing of a request packet as an example. In actual application, there may be a plurality of request packets that are uploaded by the IDS server to the identification server. In some embodiments, the identification server may select a means of filtering the request packets collected by the IDS server.

The identification server determines that the packet body field starts with the content of "\r\n"+"--"+boundary, and ends with the content of "\r\n"+"--"+boundary+"--" when the packet body ends, and determines that the request packet is the HTTP upload request packet.

The identification server determines that an interface address carried in the packet header field of the request packet corresponds to the upload interface, to identify the upload interface.

Figure 5:
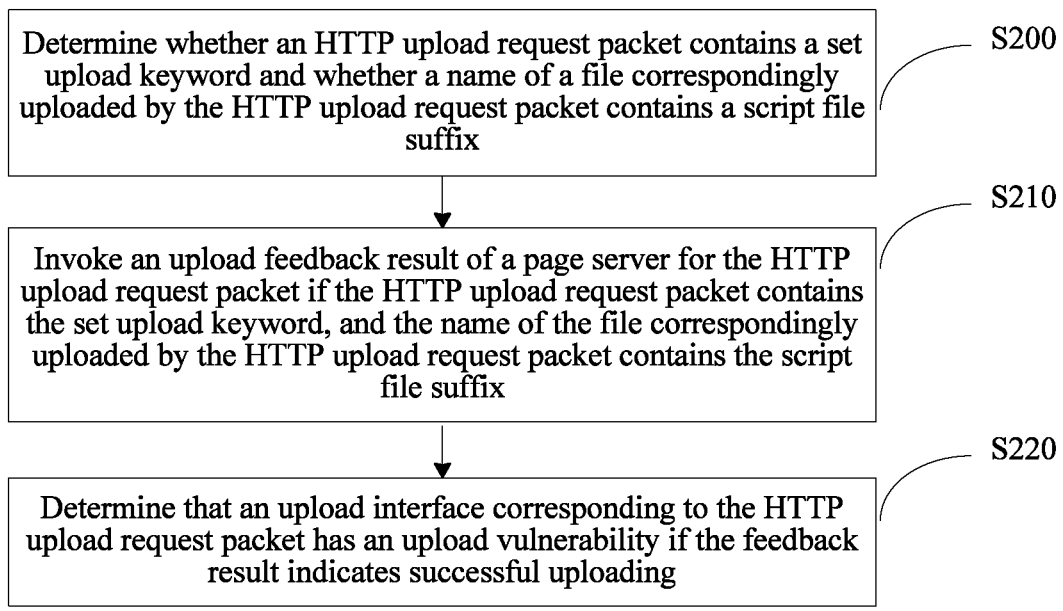
FIG. 5 is a flowchart of an upload vulnerability identification method according to an embodiment of this application.

Based on application of the upload interface identification method provided in this embodiment of this application, after the upload interface is identified, an upload vulnerability may be identified. Specifically, after the upload interface is identified by using the foregoing described content, identification of the upload vulnerability may be implemented through the method shown in FIG. 5. FIG. 5 is a flowchart of an upload vulnerability identification method according to an embodiment of this application. The method may be applied to the identification server described above (for example, a program function corresponding to vulnerability identification is provided in the identification server), or may be applied to a vulnerability identification server (the vulnerability identification server and the foregoing identification server may correspond to different physical service devices) that communicates with the identification server described above.

Referring to FIG. 5, the vulnerability identification method may include the following steps:

Step S200: Determine whether an HTTP upload request packet contains a predefined upload keyword and whether a name of a file correspondingly uploaded by the HTTP upload request packet contains a script file suffix.

In some embodiments, the predefined upload keyword may be multipart, form-data, or the like, and the HTTP upload request packet necessarily carries a file that needs to be uploaded. In this embodiment of this application, whether the file name of the file that requests to be uploaded contains the script file suffix further needs to be identified.

In some embodiments, the script file suffix is a suffix of a script file that may be uploaded through a catalogue accessed by the Web, such as ASP, PHP, JSP, HTML, and EXE. It should be noted that a script file similar to ASP, PHP, and JSP may transfer these files to a CGI interpreter, to execute any script on the page server. For example, WEBSHELL is uploaded, which is equivalent to owning rights of the page server, leading to that the upload vulnerability is used ("web" obviously means that a server is required to open a web service, and "shell" means obtaining a right for operating the server in some level; webshell is often referred to as a right for operating, by an intruder, a website server in some level through a website port; because webshell mostly appears in a form of a dynamic script, webshell is also referred to as a back door of a website).

Therefore, an HTTP upload request packet using a website vulnerability may be determined by analyzing the HTTP upload request packet that uploads the file whose file name contains the script file suffix, to subsequently determine, by analyzing a feedback result of the page server for the HTTP upload request packet, whether an upload interface corresponding to the HTTP upload request packet has an upload vulnerability.

Step S210: Invoke an upload feedback result of a page server for the HTTP upload request packet if the HTTP upload request packet contains the predefined upload keyword, and the name of the file correspondingly uploaded by the HTTP upload request packet contains the script file suffix.

Step S220: Determine that an upload interface corresponding to the HTTP upload request packet has an upload vulnerability if the feedback result indicates successful uploading.

For the HTTP upload request packet that contains the upload keyword and that uploads the file whose name contains the script file suffix, if the feedback result of the page server for the HTTP upload request packet corresponds to successful uploading, it indicates that the script file uploaded by the HTTP upload request packet is received by the page server, and a script file may be probably executed on the page server, leading to that rights of the page server are illegally controlled. This situation in which a suffix and a file type of a file uploaded by a user are not strictly limited causes an upload vulnerability of the upload interface corresponding to the HTTP upload request packet.

In some embodiments, the upload interface corresponding to the HTTP upload request packet may be regarded as an upload interface corresponding to an interface address indicated by the HTTP upload request packet.

In some embodiments, the HTTP upload request packet in the method shown in FIG. 5 is merely an optional form of the upload request packet.

In some embodiments, before the upload vulnerability is identified according to the identified HTTP upload request packets, in this embodiment of this application, secure and trusted HTTP upload request packets may be filtered from the identified HTTP upload request packets, to perform upload vulnerability identification according to dangerous and untrusted HTTP upload request packets. That is, the HTTP upload request packet processed in step S200 may be a dangerous and untrusted HTTP upload request packet.

Figure 6:
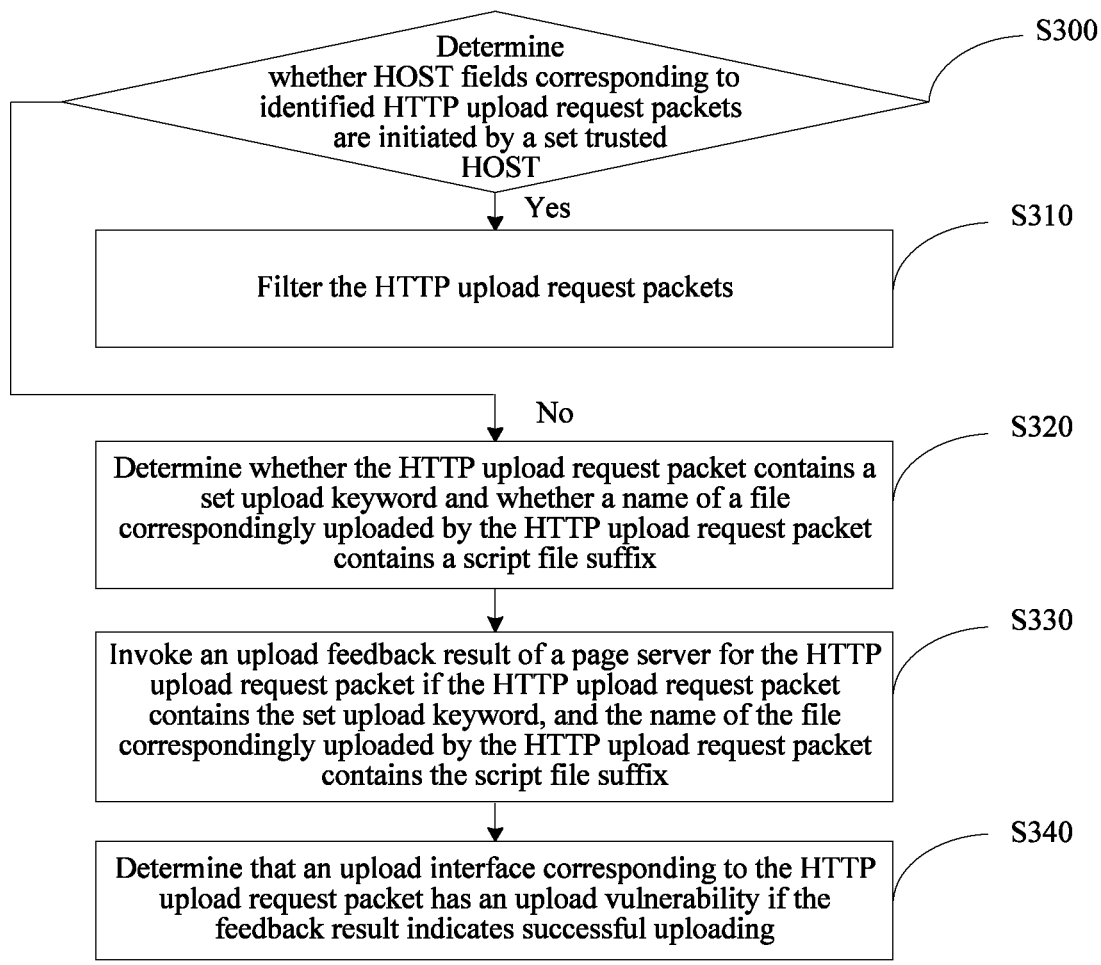
FIG. 6 is a flowchart of another upload vulnerability identification method according to an embodiment of this application.

Correspondingly, FIG. 6 shows another vulnerability identification method. Referring to FIG. 6, the vulnerability identification method may include the following steps:

Step S300: Determine whether HOST fields corresponding to identified HTTP upload request packets are initiated by a predefined trusted HOST; if yes, perform step S310; if not, perform step S320.

Step S310: Filter the HTTP upload request packets.

In some embodiments, after the HTTP upload request packets are identified through the method shown in FIG. 1 or FIG. 2, for the identified HTTP upload request packets, whether the HOST fields corresponding to the HTTP upload request packets are initiated by the set trusted HOST may be determined in this embodiment of this application. If yes, it indicates that the HTTP upload request packets are secure and trusted, the HTTP upload request packets may be filtered, and upload vulnerability identification does not need to be performed. If not, it indicates that the HTTP upload request packets may be dangerous and untrusted, and subsequent processing may be performed on the HTTP upload request packets.

Step S320: Determine whether the HTTP upload request packet contains a predefined upload keyword and whether a name of a file correspondingly uploaded by the HTTP upload request packet contains a script file suffix.

Step S330: Invoke an upload feedback result of a page server for the HTTP upload request packet if the HTTP upload request packet contains the predefined upload keyword, and the name of the file correspondingly uploaded by the HTTP upload request packet contains the script file suffix.

Step S340: Determine that an upload interface corresponding to the HTTP upload request packet has an upload vulnerability if the feedback result indicates successful uploading.

In some embodiments, the identified upload interface and the upload interface that has an upload vulnerability may be separately stored in this embodiment of this application. For example, a first database may be set to store the identified upload interface, to facilitate detection of upload vulnerabilities, and a second database may also be set to store the identified upload interface that has an upload vulnerability.

In some embodiments, for the identified upload interface that has an upload vulnerability, in this embodiment of this application, a person in charge and a maintenance department of the person in charge that correspond to the upload interface that has an upload vulnerability may be determined according to a relationship between the upload interface and the corresponding maintenance department and person in charge, and a problem hazard caused by the vulnerability of the upload interface and a corresponding solution are analyzed, so that the person in charge and the maintenance department of the person in charge corresponding to the upload interface that has an upload vulnerability, the problem hazard caused by the vulnerability of the upload interface, and the corresponding solution are summarized in a form of a system trouble ticket, and the determined maintenance department and person in charge are notified.

Figure 7:
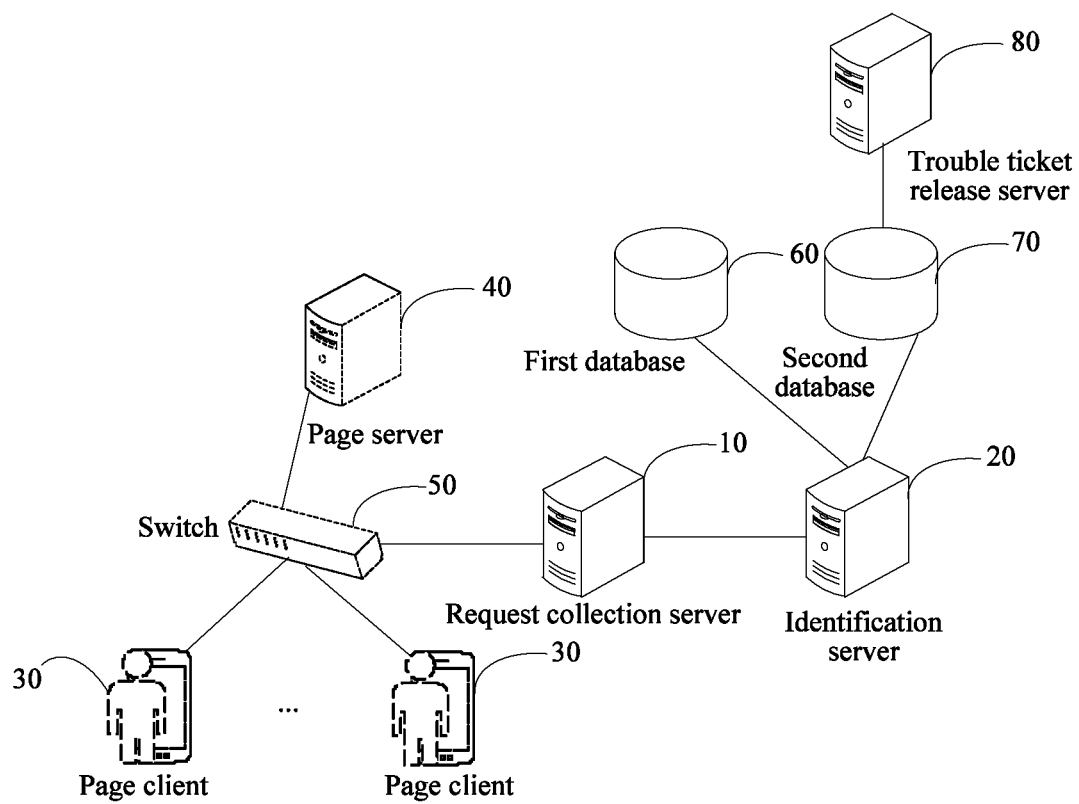
FIG. 7 is another schematic architectural diagram of an upload interface identification system according to an embodiment of this application.

As shown in FIG. 7, FIG. 7 is a schematic architectural diagram of another system. The system architecture may implement identification of an upload interface and identification of an upload interface that has an upload vulnerability. With reference to FIG. 1 and FIG. 7, the system shown in FIG. 7 may further include:

a first database 60, a second database 70, and a trouble ticket release server 80. An identification server 20 integrates functions of identification of an upload interface and identification of an upload vulnerability.

Figure 8:
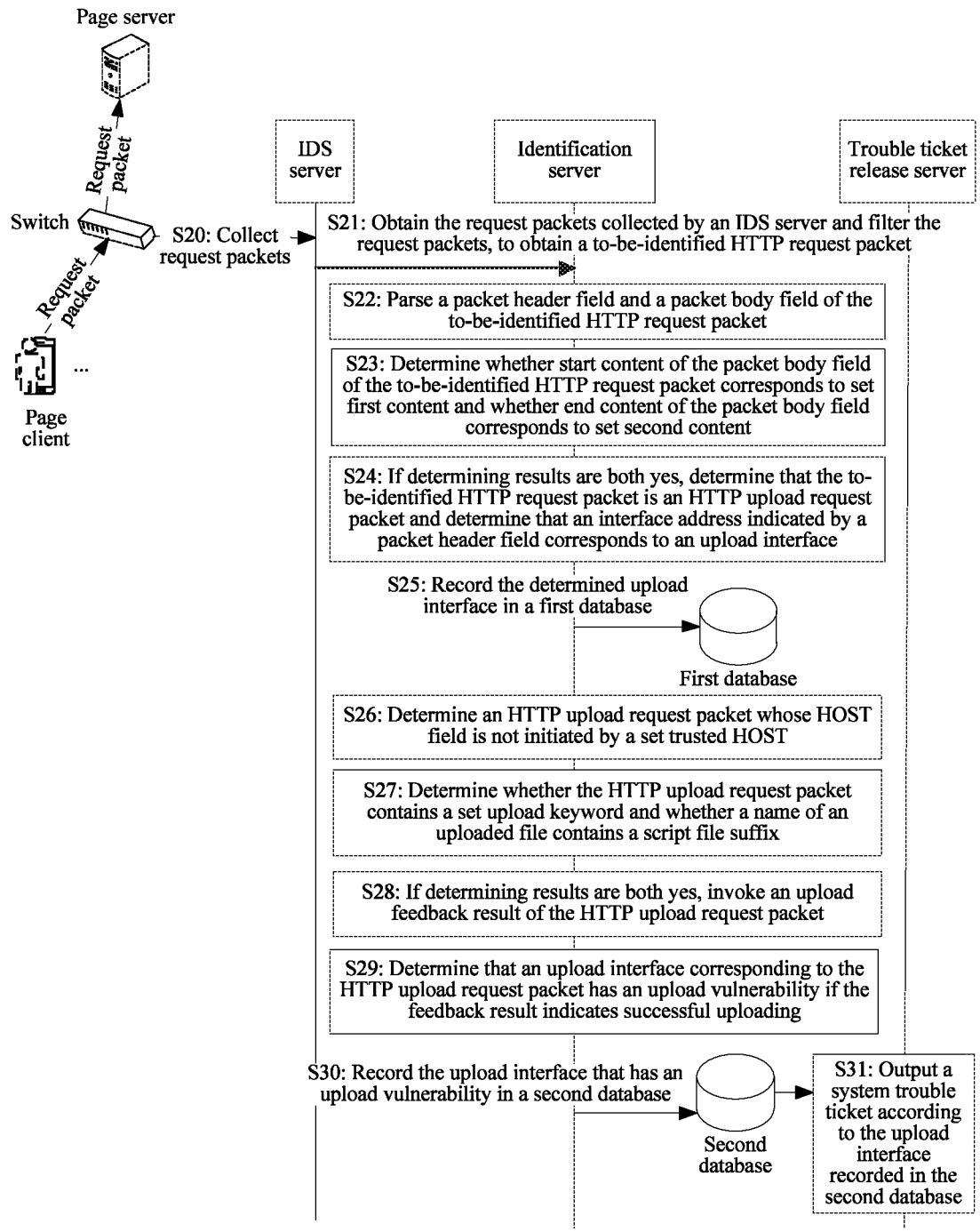
FIG. 8 is another signaling flowchart of an upload interface identification method according to an embodiment of this application.

In some embodiments, a signaling interaction procedure of a system architecture shown in FIG. 7 may be shown in FIG. 8. Referring to FIG. 8, the process may include the following steps:

Step S20: An IDS server collects request packets that are sent by a page client to a page server.

Step S21: An identification server obtains the request packets collected by the IDS server and filters the request packets, to obtain a to-be-identified HTTP request packet.

Step S22: The identification server parses a packet header field and a packet body field of the to-be-identified HTTP request packet.

Step S23: The identification server determines whether start content of the packet body field of the to-be-identified HTTP request packet corresponds to predefined first content and whether end content of the packet body field corresponds to predefined second content.

Step S24: The identification server determines that the to-be-identified HTTP request packet is an HTTP upload request packet and determines that an interface address indicated by a packet header field of the HTTP upload request packet corresponds to an upload interface if the start content of the packet body field of the to-be-identified HTTP request packet corresponds to the predefined first content, and the end content of the packet body field corresponds to the predefined second content.

Step S25: The identification server records the determined upload interface in a first database.

Step S26: The identification server determines an HTTP upload request packet whose HOST field is not initiated by a predefined trusted HOST.

Step S27: The identification server determines whether the HTTP upload request packet whose HOST field is not initiated by the set trusted HOST contains a predefined upload keyword and whether a name of a file correspondingly uploaded by the HTTP upload request packet contains a script file suffix.

Step S28: The identification server invokes an upload feedback result of a page server for the HTTP upload request packet if the HTTP upload request packet contains the predefined upload keyword, and the name of the file correspondingly uploaded by the HTTP upload request packet contains the script file suffix.

Step S29: The identification server determines that an upload interface corresponding to the HTTP upload request packet has an upload vulnerability if the feedback result indicates successful uploading.

Step S30: The identification server records the upload interface that has an upload vulnerability in a second database.

Step S31: A trouble ticket release server outputs a system trouble ticket according to the upload interface recorded in the second database, the system trouble ticket recording a person in charge and a maintenance department of the person in charge that correspond to the upload interface that has an upload vulnerability, a problem hazard caused by the vulnerability of the upload interface, and a corresponding solution.

In some embodiments, a function of the trouble ticket release server may also be integrated in the identification server.

It is proven through practices that this embodiment of this application has the following advantages in upload interface identification:

The request packets sent to the page servers are positioned, greatly improving a coverage discovery capability and accuracy of the HTTP upload request packet and improving comprehensiveness and accuracy of identification of the upload interface.

A black box behavior, such as a crawler, that may easily cause a page system to undergo high-frequency scanning, causing failures of a web application and system is not relied on, thereby avoiding performance shortage and defects of the crawler and greatly reducing a risk of a failure of the page system.

Because the request packets sent to the page server are positioned in real time, a problem of a slow collection speed of a black-box means such as a crawler and a manual means is avoided, thereby greatly improving discovery efficiency of the upload interface and improving identification efficiency of a subsequent upload vulnerability.

An HTTP-packet-based rule policy may be very flexibly defined, it is very convenient to abut the rule policy with an existing system, and it is also very convenient to expand the rule policy to discovery of other vulnerabilities.

An identification server provided in an embodiment of this application is described below. Content of the identification server described below may be regarded as a functional module architecture that needs to set by the identification server to implement the upload interface identification method provided in the embodiments of this application. Mutual reference may be correspondingly made to the content described below and the foregoing method content.

Figure 9:
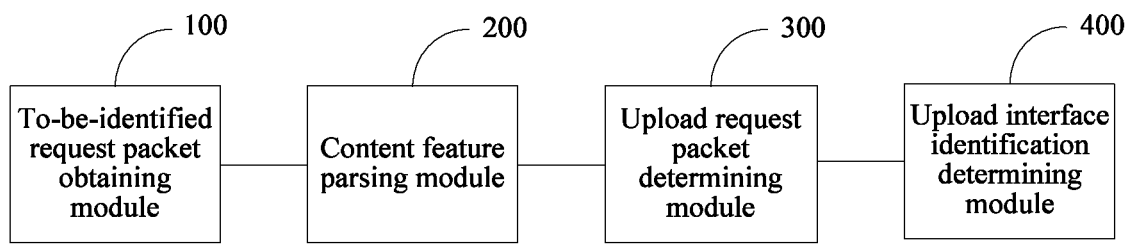
FIG. 9 is a structural block diagram of an identification server according to an embodiment of this application.

FIG. 9 is a block structural diagram of an identification server according to an embodiment of this application. Referring to FIG. 9, the identification server may include:

a to-be-identified request packet obtaining module 100, configured to obtain a to-be-identified request packet, the to-be-identified request packet being contained in request packets that are sent by a page client to a page server, where optionally, the to-be-identified request packet may be a to-be-identified HTTP request packet (that is, the request packet is assembled by using an HTTP form);

a content feature parsing module 200, configured to parse a content feature of the to-be-identified request packet;

an upload request packet determining module 300, configured to determine whether the content feature corresponds to a predefined content feature of an upload request packet authorized by the page server, where optionally, the upload request packet may be an HTTP upload request packet (that is, the upload request packet that is sent by the page client to the page server is assembled by using an HTTP form); and an upload interface identification determining module 400, configured to determine that the to-be-identified request packet is the upload request packet and determine that an interface address indicated by the upload request packet corresponds to an upload interface if the content feature corresponds to the predefined content feature of the upload request packet.

In some embodiments, the content feature parsing module 200 is specifically configured to:

parse a packet body field of the to-be-identified request packet.

Correspondingly, the upload request packet determining module 300 is specifically configured to:

determine whether start content of the packet body field corresponds to predefined first content and whether end content of the packet body field corresponds to predefined second content, the predefined first content being start content followed by the upload request packet in the packet body field, and the predefined second content being end content followed by the upload request packet in the packet body field.

In some embodiments, the content feature parsing module 200 is further configured to:

parse a packet header field of the to-be-identified request packet (that is, the content feature parsing module 200 may parse a packet body field and a packet header field of the to-be-identified request packet).

Correspondingly, the upload interface identification determining module 400 is specifically configured to:

determine that the to-be-identified request packet is the upload request packet if the start content of the packet body field corresponds to the predefined first content, and the end content of the packet body field corresponds to the predefined second content.

The upload interface identification determining module 400 is specifically configured to:

determine that an interface address indicated by a packet header field of the upload request packet corresponds to the upload interface.

In some embodiments, the to-be-identified request packet may be a request packet that is obtained after filtering the collected request packets that are sent by the page client to the page server. Correspondingly, the to-be-identified request packet obtaining module 100 is specifically configured to:

obtain request packets that are collected by an IDS server and that are sent by the page client to the page server; and filter the obtained request packets, to obtain the to-be-identified request packet, the to-be-identified request packet being a non-repeating request packet that is sent by the page client to the page server and that uses the HTTP.

Figure 10:
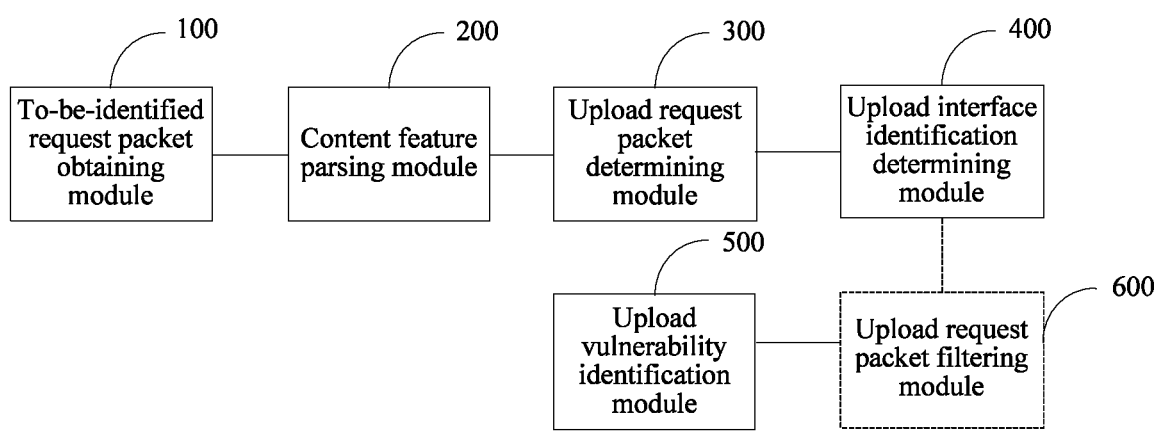
FIG. 10 is another structural block diagram of an identification server according to an embodiment of this application.

In some embodiments, FIG. 10 shows another structure of an identification server according to an embodiment of this application. With reference to FIG. 9 and FIG. 10, the identification server may further include:

an upload vulnerability identification module 500, configured to determine whether the upload request packet contains a predefined upload keyword and whether a name of file to be uploaded by the upload request packet contains a script file suffix; invoke an upload feedback result of the upload request packet if the upload request packet contains the predefined upload keyword, and the name of the file to be uploaded by the upload request packet contains the script file suffix; and determine that an upload interface corresponding to the HTTP upload request packet has an upload vulnerability if the feedback result indicates successful uploading.

In some embodiments, as shown in FIG. 10, the identification server may further include:

an upload request packet filtering module 600, configured to determine whether a HOST field corresponding to the upload request packet is initiated by a predefined trusted HOST; and trigger an upload vulnerability identification module 500 to perform the step of determining whether the upload request packet contains a predefined upload keyword and whether a name of file to be uploaded by the upload request packet contains a script file suffix if the HOST field corresponding to the upload request packet is not initiated by the set trusted HOST.

That is, the upload request packet processed by the upload vulnerability identification module 500 may be an upload request packet that is obtained through filtering by the upload request packet filtering module 600 and that is not initiated by the set trusted HOST.

In some embodiments, the upload request packet filtering module 600 may not be used in the identification server shown in FIG. 10.

Figure 11:
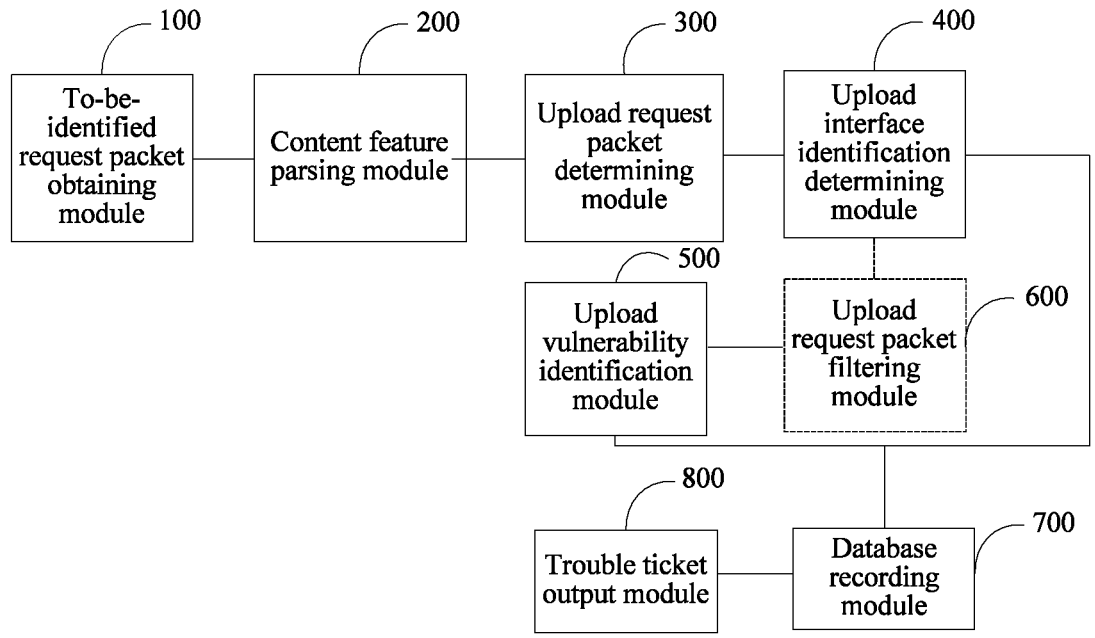
FIG. 11 is still another structural block diagram of an identification server according to an embodiment of this application.

In some embodiments, FIG. 11 shows still another structure of an identification server according to an embodiment of this application. With reference to FIG. 10 and FIG. 11, the identification server may further include:

a database recording module 700, configured to record the determined upload interface in a first database and record the determined upload interface that has an upload vulnerability in a second database; and a trouble ticket output module 800, configured to output a system trouble ticket according to the upload interface recorded in the second database, the system trouble ticket recording a person in charge and a maintenance department of the person in charge that correspond to the upload interface that has an upload vulnerability, a problem hazard caused by the vulnerability of the upload interface, and a corresponding solution.

In some embodiments, the trouble ticket output module 800 may not be used in the identification server shown in FIG. 11.

The identification server provided in this embodiment of this application can lower a detection missing probability of the upload interface and improve comprehensiveness of identification of the upload interface, thereby further improving accuracy of identification of the upload interface, to make it possible to improve comprehensiveness and accuracy of identification of an upload vulnerability.

An embodiment of this application further provides an upload interface identification system. The structure of the upload interface identification system include a request collection server and an identification server, as shown in FIG. 1.

The request collection server is configured to collect request packets that are sent by a page client to a page server.

The identification server is configured to obtain a to-be-identified request packet from the request packets collected by the request collection server; parse a content feature of the to-be-identified request packet; determine whether the content feature corresponds to a predefined content feature of an upload request packet authorized by the page server; and determine that the to-be-identified request packet is the upload request packet and determine that an interface address indicated by the upload request packet corresponds to an upload interface if the content feature corresponds to the predefined content feature of the upload request packet.

In some embodiments, refer to descriptions of corresponding parts above for specific function implementation details of the request collection server and the identification server, and expanded implementation functions.

In some embodiments, in this embodiment of this application, the identification server is further configured to determine whether the upload request packet contains a predefined upload keyword and whether a name of file to be uploaded by the upload request packet contains a script file suffix; invoke an upload feedback result of the upload request packet if the upload request packet contains the predefined upload keyword, and the name of the file to be uploaded by the upload request packet contains the script file suffix; and determine that an upload interface corresponding to the HTTP upload request packet has an upload vulnerability if the feedback result indicates successful uploading.

In some embodiments, another structure of the upload interface identification system provided in an embodiment of this application may be shown in FIG. 7. With reference to FIG. 1 and FIG. 7, the upload interface identification system may include a first database, a second database, and a trouble ticket release server.

The first database is configured to record the determined upload interface.

The second database is configured to record the determined upload interface that has an upload vulnerability.

The trouble ticket release server is configured to output a system trouble ticket according to the upload interface recorded in the second database, the system trouble ticket recording a person in charge and a maintenance department of the person in charge that correspond to the upload interface that has an upload vulnerability, a problem hazard caused by the vulnerability of the upload interface, and a corresponding solution.

According to still another aspect of the embodiments of the present invention, an electronic apparatus for implementing the foregoing upload interface identification method is further provided.

Figure 12:
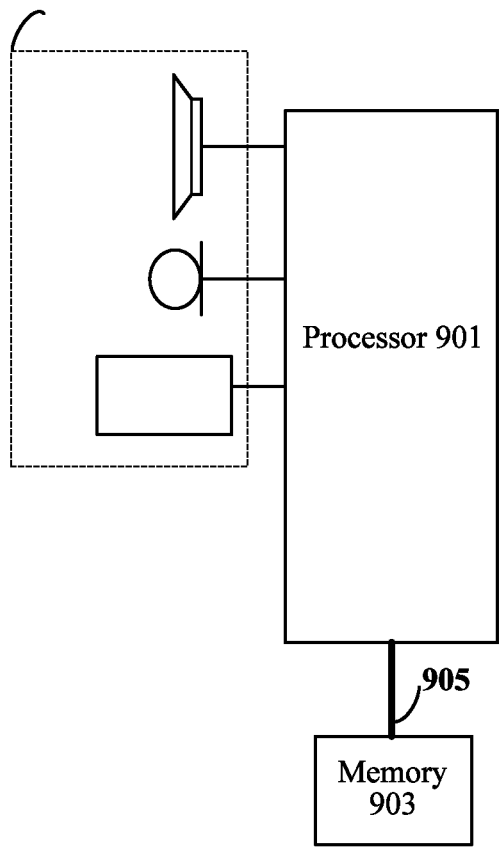
FIG. 12 is a structural block diagram of an electronic apparatus according to an embodiment of this application.

FIG. 12 is a structural block diagram of an electronic apparatus according to an embodiment of the present invention. As shown in FIG. 12, the electronic apparatus may include: one or more processors 901 (only one is shown in the figure), a memory 903, and a transmission apparatus 905. As shown in FIG. 12, the server may further include an input/output device 907.

The memory 903 may be configured to store software programs and modules, for example, program instructions/modules corresponding to the upload interface identification method and apparatus in the embodiments of the present invention. The processor 901 is configured to run the software programs and modules stored in the memory 903, to perform various functional applications and data processing, to be specific, implement the upload interface identification method. The memory 903 may include a high-speed random memory, and may also include a nonvolatile memory such as one or more magnetic storage apparatuses, a flash memory, or another nonvolatile solid-state memory. In some examples, the memory 903 may further include memories remotely disposed relative to the processor 901, and these remote memories may be connected to the terminal through a network. Examples of the network include, but are not limited to, the Internet, an intranet, a local area network, a mobile communications network, and a combination thereof.

The transmission apparatus 905 is configured to receive or send data via a network and may further be configured to transmit data of the processor and the memory. Specific examples of the foregoing network may include a wired network and a wireless network. In an example, the transmission apparatus 905 includes a network interface controller (NIC) that may be connected to another network device and a router by using a network cable, thereby communicating with the Internet or a local area network. In an example, the transmission apparatus 905 is a radio frequency (RF) module that is configured to communicate with the Internet in a wireless manner.

In some embodiments, the memory 903 is configured to store an application program.

The processor 901 is configured to run a program, and perform the upload interface identification method of the present disclosure when the program is run. The processor 901 may invoke, by using the transmission apparatus 905, the application program stored in the memory 903, so as to perform the following steps:

obtaining a to-be-identified request packet, the to-be-identified request packet being contained in request packets that are sent by a page client to a page server;

parsing a content feature of the to-be-identified request packet;

determining whether the content feature corresponds to a predefined content feature of an upload request packet authorized by the page server; and determining that the to-be-identified request packet is the upload request packet and determining that an interface address indicated by the upload request packet corresponds to an upload interface if the content feature corresponds to the predefined content feature of the upload request packet.

In some embodiments, an optional manner for the processor 901 to obtain the to-be-identified HTTP request packet may be: obtaining the request packets that are collected by the IDS server and that are sent by the page client to the page server, and filtering the obtained request packets, to obtain a non-repeating request packet that is sent by the page client to the page server and that uses the HTTP.

In some embodiments, the processor 901 may directly use the request packets that are collected by the IDS server and that are sent by the page client to the page server as the to-be-identified HTTP request packets.

In some embodiments, the to-be-identified HTTP request packet is merely an optional form of the to-be-identified request packet when the HTTP is used, and the to-be-identified request packet may be contained in the request packets that are sent by the page client to the page server.

In some embodiments, the processor 901 may parse a packet header field and a packet body field of the to-be-identified HTTP request packet. The content feature herein is not limited to corresponding to content of the parsed packet body field.

In some embodiments, the processor 901 may determine whether start content of the packet body field of the to-be-identified HTTP request packet corresponds to predefined first content and whether end content of the packet body field corresponds to predefined second content. In addition, the predefined first content may be start content that is followed by an HTTP upload request packet in the packet body field according to the HTTP, and the predefined second content may be end content that is followed by the HTTP upload request packet in the packet body field according to the HTTP.

In some embodiments, in addition to that the content feature of the HTTP upload request packet is set by setting the start content and the end content of the HTTP upload request packet, other manners may be used in this embodiment of this application to set the content feature of the HTTP upload request packet. For example, particular identification character is set in packet header content of the HTTP upload request packet, and the identification character may be used for representing the HTTP upload request packet.

In some embodiments, the HTTP upload request packet is merely an optional form of an upload request packet in this embodiment of this application. When other protocols are used, the form of the upload request packet may be correspondingly adjusted.

In some embodiments, if the content feature of the to-be-identified HTTP request packet corresponds to the predefined content feature of the HTTP upload request packet, the indicated interface address is extracted from the packet header field of the to-be-identified HTTP request packet, and that the interface address corresponds to the upload interface is determined.

In the technical solutions provided in this embodiment of this application, the processor 901 may obtain a to-be-identified HTTP request packet, the to-be-identified HTTP request packet being contained in request packets that are sent by a page client to a page server and that use the HTTP, so that the processor 901 may parse a content feature of the to-be-identified HTTP request packet, and determine whether the content feature corresponds to a predefined content feature of an HTTP upload request packet. The processor 901 may determine that the to-be-identified HTTP request packet is the HTTP upload request packet and determine that an interface address indicated by the HTTP upload request packet corresponds to an upload interface if the content feature corresponds to the predefined content feature of the HTTP upload request packet, to identify the upload interface.

It should be noted that being constrained by a network protocol such as the HTTP, the HTTP upload request packet needs to carry a content feature that is agreed upon. Therefore, a request packet whose content feature corresponds to a predefined content feature of the HTTP upload request packet is determined by performing content feature analysis on a request packet sent to the page server, to effectively identify a request packet of an upload request, to determine that the interface address indicated by the identified request packet corresponds to the upload interface, to identify the upload interface. Because an HTTP upload request, for example, necessarily carries the content feature that is agreed upon, the upload request packet is identified through the content feature, to determine the upload interface with the interface address indicated by the identified upload request packet, to comprehensively identify the upload request packet. In addition, comprehensiveness of the identified upload interface is correspondingly improved, and a detection missing probability is lowered.

In some embodiments, refer to the examples described in the foregoing embodiments for specific examples in this embodiment. Details are not described in this embodiment.

A person of ordinary skill in the art may understand that, the structure shown in FIG. 12 is only schematic. Alternatively, the electronic apparatus may be a terminal device such as a smartphone (such as an Android mobile phone or an iOS mobile phone), a tablet computer, a palmtop computer, a mobile Internet device (MID), or a PAD. FIG. 12 does not limit the structure of the foregoing electronic apparatus. For example, the electronic apparatus may further include more or fewer components (such as a network interface and a display apparatus) than those shown in FIG. 12, or have a configuration different from that shown in FIG. 12.

A person of ordinary skill in the art may understand that all or some of steps of the methods of the foregoing embodiments may be completed by a program instructing hardware related to a terminal device. The program may be stored in a computer readable storage medium.

An embodiment of the present invention further provides a storage medium. The storage medium includes a stored program, and the program performs the upload interface identification method when run. In some embodiments, in this embodiment, the storage medium stores a computer program. The computer program, when run, is configured to perform the upload interface identification method.

In some embodiments, in this embodiment, the storage medium may be located in at least one of a plurality network devices in the network shown in the foregoing embodiments.

In some embodiments, in this embodiment, the storage medium is configured to store program code for performing the following steps:

obtaining a to-be-identified request packet, the to-be-identified request packet being contained in request packets that are sent by a page client to a page server;

parsing a content feature of the to-be-identified request packet;

determining whether the content feature corresponds to a predefined content feature of an upload request packet authorized by the page server; and determining that the to-be-identified request packet is the upload request packet and determining that an interface address indicated by the upload request packet corresponds to an upload interface if the content feature corresponds to the predefined content feature of the upload request packet.

An optional manner of obtaining the to-be-identified HTTP request packet may be: obtaining the request packets that are collected by the IDS server and that are sent by the page client to the page server, and filtering the obtained request packets, to obtain a non-repeating request packet that is sent by the page client to the page server and that uses the HTTP.

In some embodiments, the request packets that are collected by the IDS server and that are sent by the page client to the page server may be directly used as the to-be-identified HTTP request packets.

The to-be-identified HTTP request packet is merely an optional form of the to-be-identified request packet when the HTTP is used, and the to-be-identified request packet may be contained in the request packets that are sent by the page client to the page server.

In some embodiments, a packet header field and a packet body field of the to-be-identified HTTP request packet may be parsed. The content feature herein is not limited to corresponding to content of the parsed packet body field.

In some embodiments, the storage medium is further configured to store program code for performing the following step: determining whether start content of the packet body field of the to-be-identified HTTP request packet corresponds to predefined first content and whether end content of the packet body field corresponds to predefined second content. In addition, the predefined first content may be start content that is followed by an HTTP upload request packet in the packet body field according to the HTTP, and the predefined second content may be end content that is followed by the HTTP upload request packet in the packet body field according to the HTTP.

In some embodiments, in addition to that the content feature of the HTTP upload request packet is set by setting the start content and the end content of the HTTP upload request packet, other manners may be used in this embodiment of this application to set the content feature of the HTTP upload request packet. For example, particular identification character is set in packet header content of the HTTP upload request packet, and the identification character may be used for representing the HTTP upload request packet.

In some embodiments, the HTTP upload request packet is merely an optional form of an upload request packet in this embodiment of this application. When other protocols are used, the form of the upload request packet may be correspondingly adjusted.

In some embodiments, the storage medium is further configured to store program code for performing the following steps: if the content feature of the to-be-identified HTTP request packet corresponds to the predefined content feature of the HTTP upload request packet, extracting the indicated interface address from the packet header field of the to-be-identified HTTP request packet, and determining that the interface address corresponds to the upload interface.

In some embodiments, refer to the examples described in the foregoing embodiments for specific examples in this embodiment. Details are not described in this embodiment.

In some embodiments, in this embodiment, the foregoing storage medium may include but is not limited to: any medium that can store program code, such as a USB flash drive, a ROM, a RAM, a removable hard disk, a magnetic disk, or an optical disc.

The upload interface identification method and apparatus, the storage medium, and the electronic apparatus according to the present disclosure are described above by using examples with reference to the accompanying drawings. However, a person skilled in the art should understand that, various improvements may be further made for the upload interface identification method and apparatus, the storage medium, and the electronic apparatus proposed in the present disclosure without departing from content of the present disclosure. Therefore, the protection scope of the present disclosure should be subject to content of the appended claims.

It should be noted that the embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

A person skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art can use different methods to implement the described functions for each particular application, but it should not be considered that the implementation goes beyond the scope of the embodiments of this application.

In combination with the embodiments herein, steps of the method or algorithm described may be directly implemented using hardware, a software module executed by a processor, or a combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The above descriptions of the disclosed embodiments make a person skilled in the art implement or use this application. Various modifications to these embodiments are obvious to a person skilled in the art, and the general principles defined in this specification may be implemented in other embodiments without departing from the spirit and scope of this application. Therefore, this application is not limited to these embodiments illustrated in this application, but needs to conform to the broadest scope consistent with the principles and novel features disclosed in this application.

INDUSTRIAL APPLICABILITY

In the embodiments of this application, a request packet whose content feature corresponds to a predefined content feature of the upload request packet is determined by performing content feature analysis on a request packet sent to the page server, to effectively identify a request packet of an upload request, to determine that the interface address indicated by the identified request packet corresponds to the upload interface, to identify the upload interface. Because an HTTP upload request, for example, necessarily carries the content feature that is agreed upon, the upload request packet is identified through the content feature, to determine the upload interface with the interface address indicated by the identified upload request packet, to comprehensively identify the upload request packet. In addition, comprehensiveness of the identified upload interface is correspondingly improved, and a detection missing probability is lowered.

What is claimed is:

1. An upload interface identification method performed at an identification server having one or more processors and memory storing a plurality of instructions to be executed by the server, the method comprising:
    obtaining request packets that are collected by an intrusion detection system (IDS) server, wherein the request packets are sent by a page client to a page server;
    filtering the obtained request packets, to obtain a to-be-identified request packet, the to-be-identified request packet being a non-repeating request packet that is sent by the page client to the page server using the Hypertext Transfer Protocol (HTTP);
    parsing a content feature of the to-be-identified request packet;
    determining whether the content feature corresponds to a predefined content feature of an upload request packet authorized by the page server; and
    in accordance with a determination that the content feature corresponds to the predefined content feature of the upload request packet:
        determining that the to-be-identified request packet is the upload request packet and that an interface address indicated by the upload request packet corresponds to an upload interface of the to-be-identified request packet.

2. The upload interface identification method according to claim 1, wherein the parsing a content feature of the to-be-identified request packet comprises:
    parsing a packet body field of the to-be-identified request packet; and
    the determining whether the content feature corresponds to a predefined content feature of an upload request packet authorized by the page server comprises:
    determining whether start content of the packet body field corresponds to predefined first content and whether end content of the packet body field corresponds to predefined second content, the predefined first content being start content followed by the upload request packet in the packet body field, and the predefined second content being end content followed by the upload request packet in the packet body field.

3. The upload interface identification method according to claim 2, wherein the parsing a content feature of the to-be-identified request packet further comprises:
    parsing a packet header field of the to-be-identified request packet;
    the determining that the to-be-identified request packet is the upload request packet if the content feature corresponds to the predefined content feature of the upload request packet comprises:
    determining that the to-be-identified request packet is the upload request packet if the start content of the packet body field corresponds to the predefined first content, and the end content of the packet body field corresponds to the predefined second content; and
    the determining that an interface address indicated by the upload request packet corresponds to an upload interface comprises:
    determining that an interface address indicated by a packet header field of the upload request packet corresponds to the upload interface.

4. The upload interface identification method according to claim 1, further comprising:
    determining whether the upload request packet contains a predefined upload keyword and whether a name of file to be uploaded by the upload request packet contains a script file suffix;
    invoking an upload feedback result of the upload request packet if the upload request packet contains the predefined upload keyword, and the name of the file to be uploaded by the upload request packet contains the script file suffix; and
    determining that an upload interface corresponding to a HTTP upload request packet has an upload vulnerability if the feedback result indicates successful uploading.

5. The upload interface identification method according to claim 4, further comprising:
    determining whether a HOST field corresponding to the upload request packet in a webpage received by the page client is initiated by a predefined trusted HOST; and
    performing the step of determining whether the upload request packet contains a predefined upload keyword and whether the name of the file to be uploaded by the upload request packet contains a script file suffix if the HOST field corresponding to the upload request packet is not initiated by the set trusted HOST.

6. The upload interface identification method according to claim 5, further comprising:

recording the determined upload interface in a first database and recording the determined upload interface that has an upload vulnerability in a second database.

7. The upload interface identification method according to claim 6, further comprising:

outputting a system trouble ticket according to the upload interface recorded in the second database, the system trouble ticket recording a person in charge and a maintenance department of the person in charge that correspond to the upload interface that has an upload vulnerability, a problem hazard caused by the vulnerability of the upload interface, and a corresponding solution.

8. An identification server, comprising one or more processors, memory coupled to the one or more processors, and a plurality of program modules stored in the memory, the program modules, when executed by the one or more processors, cause the identification server to perform a plurality of operations including:

obtaining request packets that are collected by an intrusion detection system (IDS) server, wherein the request packets are sent by a page client to a page server;

filtering the obtained request packets, to obtain a to-be-identified request packet, the to-be-identified request packet being a non-repeating request packet that is sent by the page client to the page server using the Hypertext Transfer Protocol (HTTP);

parsing a content feature of the to-be-identified request packet;

determining whether the content feature corresponds to a predefined content feature of an upload request packet authorized by the page server; and in accordance with a determination that the content feature corresponds to the predefined content feature of the upload request packet:

determining that the to-be-identified request packet is the upload request packet and that an interface address indicated by the upload request packet corresponds to an upload interface of the to-be-identified request packet.

9. The identification server according to claim 8, wherein the parsing a content feature of the to-be-identified request packet comprises:

parsing a packet body field of the to-be-identified request packet; and the determining whether the content feature corresponds to a predefined content feature of an upload request packet authorized by the page server comprises:

determining whether start content of the packet body field corresponds to predefined first content and whether end content of the packet body field corresponds to predefined second content, the predefined first content being start content followed by the upload request packet in the packet body field, and the predefined second content being end content followed by the upload request packet in the packet body field.

10. The identification server according to claim 9, wherein the parsing a content feature of the to-be-identified request packet further comprises:

parsing a packet header field of the to-be-identified request packet;

the determining that the to-be-identified request packet is the upload request packet if the content feature corresponds to the predefined content feature of the upload request packet comprises:

determining that the to-be-identified request packet is the upload request packet if the start content of the packet body field corresponds to the predefined first content, and the end content of the packet body field corresponds to the predefined second content; and the determining that an interface address indicated by the upload request packet corresponds to an upload interface comprises:

determining that an interface address indicated by a packet header field of the upload request packet corresponds to the upload interface.

11. The identification server according to claim 8, wherein the plurality of operations further comprise:

determining whether the upload request packet contains a predefined upload keyword and whether a name of file to be uploaded by the upload request packet contains a script file suffix;

invoking an upload feedback result of the upload request packet if the upload request packet contains the predefined upload keyword, and the name of the file to be uploaded by the upload request packet contains the script file suffix; and determining that an upload interface corresponding to a HTTP upload request packet has an upload vulnerability if the feedback result indicates successful uploading.

12. The identification server according to claim 11, wherein the plurality of operations further comprise:

determining whether a HOST field corresponding to the upload request packet in a webpage received by the page client is initiated by a predefined trusted HOST; and performing the step of determining whether the upload request packet contains a predefined upload keyword and whether the name of the file to be uploaded by the upload request packet contains a script file suffix if the HOST field corresponding to the upload request packet is not initiated by the set trusted HOST.

13. The identification server according to claim 12, wherein the plurality of operations further comprise:

recording the determined upload interface in a first database and recording the determined upload interface that has an upload vulnerability in a second database.

14. The identification server according to claim 13, wherein the plurality of operations further comprise:

outputting a system trouble ticket according to the upload interface recorded in the second database, the system trouble ticket recording a person in charge and a maintenance department of the person in charge that correspond to the upload interface that has an upload vulnerability, a problem hazard caused by the vulnerability of the upload interface, and a corresponding solution.

15. A non-transitory computer readable storage medium storing a plurality of machine readable instructions in connection with an identification server having one or more processors, wherein the plurality of machine readable instructions, when executed by the one or more processors, cause the identification server to perform a plurality of operations including:

obtaining request packets that are collected by an intrusion detection system (ID S) server, wherein the request packets are sent by a page client to a page server;

filtering the obtained request packets, to obtain a to-be-identified request packet, the to-be-identified request packet being a non-repeating request packet that is sent by the page client to the page server using the Hypertext Transfer Protocol (HTTP);

parsing a content feature of the to-be-identified request packet;

determining whether the content feature corresponds to a predefined content feature of an upload request packet authorized by the page server; and in accordance with a determination that the content feature corresponds to the predefined content feature of the upload request packet:

determining that the to-be-identified request packet is the upload request packet and that an interface address indicated by the upload request packet corresponds to an upload interface of the to-be-identified request packet.

16. The non-transitory computer readable storage medium according to claim 15, wherein the parsing a content feature of the to-be-identified request packet comprises:

parsing a packet body field of the to-be-identified request packet; and the determining whether the content feature corresponds to a predefined content feature of an upload request packet authorized by the page server comprises:

determining whether start content of the packet body field corresponds to predefined first content and whether end content of the packet body field corresponds to predefined second content, the predefined first content being start content followed by the upload request packet in the packet body field, and the predefined second content being end content followed by the upload request packet in the packet body field.

17. The non-transitory computer readable storage medium according to claim 15, wherein the plurality of operations further comprise:

determining whether the upload request packet contains a predefined upload keyword and whether a name of file to be uploaded by the upload request packet contains a script file suffix;

invoking an upload feedback result of the upload request packet if the upload request packet contains the predefined upload keyword, and the name of the file to be uploaded by the upload request packet contains the script file suffix; and determining that an upload interface corresponding to a HTTP upload request packet has an upload vulnerability if the feedback result indicates successful uploading.

\* \* \* \* \*